United States Patent Office 2,991,294
Patented July 4, 1961

2,991,294
1-METHYL EQUILENIN COMPOUNDS AND PROCESS FOR MAKING
Carl Djerassi, George Rosenkranz, Stephen Kaufmann, John Pataki, and Jesus Romo, Mexico City, Mexico, assignors to Syntex S.A., Mexico City, Mexico, a corporation of Mexico
No Drawing. Original application Feb. 17, 1954, Ser. No. 413,952, now Patent No. 2,791,592, dated May 7, 1957. Divided and this application Feb. 8, 1957, Ser. No. 641,991
10 Claims. (Cl. 260—397.4)

The present invention relates to cyclopentanoperhydrophenanthrene compounds. More particularly the present invention relates to novel estrogens and the production thereof and especially 1-methyl estrogens.

It has been previously set forth in the prior literature, as for example Inhoffen, Angew. Chem. Vol. 59, p. 207, 1947, that the 1,4-diene-3-ones of the steroid series readily undergo aromatization of ring A with a concomitant migration of the angular methyl group to yield so-called 1-methyl phenols, as for example 1-methyl estradiol, 1-methyl estrone, etc. These compounds were insoluble in alkali and devoid of estrogenic activity.

In accordance with the present invention various compounds have been prepared probably possessing the 1-methyl configuration and having very substantial estrogenic activity. Further, in contrast to the previously disclosed compounds the new compounds are soluble in alkali, have different melting points and other properties, and upon admixture with the previously known compounds have clearly demonstrated their difference as by depression of the melting points.

In application Serial No. 152,498, filed March 28, 1950, now Patent No. 2,705,237, a novel process for the production of estrogens and intermediates is disclosed. Among the estrogen intermediates disclosed in this application are the novel $\Delta^{1,4,6}$-3-ketosteroids. In particular, application Serial No. 152,498 discloses $\Delta$1,4,6-3-ketosteroids which may be exemplified by the following formula:

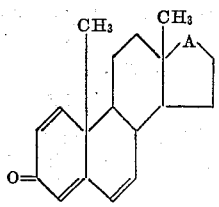

wherein A may be C=C or CH—OR and R may be hydrogen, a lower alkyl group, as for example methyl or ethyl or an aromatic group such as benzyl or a residue of a lower fatty acid or an aromatic acid, as for example acetic acid, propionic acid or benzoic acid. It has been found in accordance with the present invention that $\Delta^{1,4,6}$-3-ketosteroids, and particularly compounds of the character described, upon treatment with a catalyst capable of promoting the dienonephenol rearrangement, as for example acetic acid/anhydride or propionic acid/anhydride together with paratoluene sulfonic acid will rearrange to produce novel 1-methyl-$\Delta^6$-estrogens which exhibited estrogenic properties.

It has been further discovered in accordance with the present invention that the 1-methyl-$\Delta^6$-estrogens thus produced could be readily hydrogenated utilizing a hydrogenation catalyst to produce in good yield 1-methyl estrogens, as for example 1-methyl estrone or 1-methyl estradiol, these novel 1-methyl estrogens together with their ester and ether derivatives exhibiting definite estrogenic properties and being soluble in dilute alkali.

It has further been found in accordance with the present invention that the 1-methyl-$\Delta^6$-estrogens could be dehydrogenated in the presence of a suitable catalyst to produce the novel 1-methyl equilenin and derivatives thereof.

The production of the novel 1-methyl-$\Delta^6$-estrogen compounds of the present invention may be exemplified by the following equation:

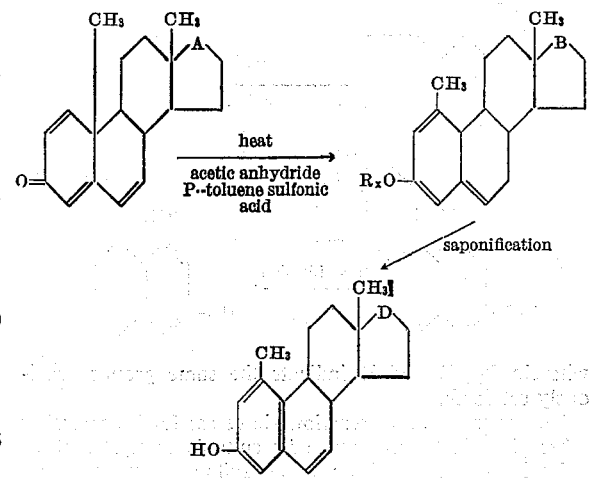

In the above equation A may represent the groups previously set forth. $R_x$ represents the residue of acetic acid or in the event propionic anhydride is used the residue of propionic acid. B represents C=O and C—$OR_y$ and $R_y$ may be a lower alkyl group, as for example methyl or ethyl or an aromatic group such as benzyl or the residue of a lower fatty acid or an aromatic acid as for example acetic acid, propionic acid or benzoic acid. D represents C=O or C—OH.

In practicing the dienone phenol rearrangement above set forth a mixture of trienone with paratoluene sulfonic acid and the acetic or propionic anhydride could be heated on a steam bath for a suitable period of time, as for example five hours. The resultant solution was then cooled and hydrolyzed by agitation with water and the crystaline product thus precipitated was filtered, dried and recrystalized from a suitable solvent, as for example an alcohol such as methanol. The products could be then further recrystallized from similar organic solvents for purification. The reaction proceeded both with the esters of the $\Delta^{1,4,6}$-3-ketosteroids and also with the free compounds, i.e. those compounds wherein A is C—OH, since those compounds were esterified under the conditions of the reaction. For example the product of the dienone phenol rearrangement of $\Delta^{1,4,6}$-androstatrien-3,17-dione using acetic anhydride was 1-methyl-$\Delta^6$-dehydroestrone acetate and the product of the dienone phenol rearrangement of both $\Delta^{1,4,6}$-androstatrien-17-ol-3-one and its 17-acetate, was 1-methyl-$\Delta^6$-dehydroestradiol-3,17-diacetate. The esters thus produced could then be converted to the free compounds as by saponification with an alcoholic solution of a suitable alkali metal hydroxide by refluxing the ester therewith. Sulfonic acid could be also used as a catalyst in place of the toluene sulfonic acid for the rearrangement of the alcohols and derivative compounds, i.e. where A was C—OR, and in this case the reaction was carried out at room temperature.

The 1-methyl-$\Delta^6$-dehydroestrone compounds may also be reduced utilizing lithium aluminum hydride to the corresponding 1-methyl-$\Delta^6$-dehydroestradiol compounds. This reaction may be performed generally by dissolving the 1-methyl-$\Delta^6$-dehydroestrone acetate for example in a dry solvent, i.e. preferably an ether solvent, and refluxing the same with lithium aluminum hydride. The 1-methyl-$\Delta^6$-dehydroestradiol which is thus produced is entirely similar to that produced by the dienone phenol rearrangement previously set forth.

The 1-methyl-Δ⁶ compounds produced in accordance with the foregoing reaction can be readily hydrogenated to the corresponding 1-methyl estrogen in accordance with the following equation:

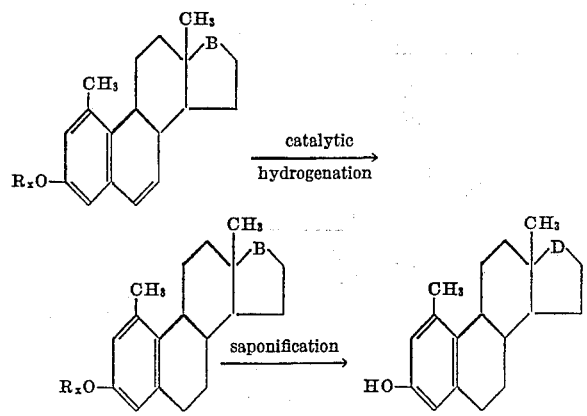

wherein $R_X$, B and D indicate the same groups previously set forth.

The hydrogenation reaction above set forth preferably takes place in the presence of a suitable catalyst such as palladium-on-charcoal or other suitable hydrogenation catalyst. For example, when a solution of 1-methyl-Δ⁶-dehydroestrone acetate in ethyl acetate in the presence of a 10% palladium-on-charcoal catalyst was shaken in an atmosphere of hydrogen for approximately two hours or until the hydrogen take-up corresponded to 1 mol, 1-methyl estrone acetate was produced. The 1-methyl estrone acetate could then be saponified to produce 1-methyl estrone.

The 1-methyl-Δ⁶-dehydroestrogens can also be dehydrogenated to produce the corresponding novel 1-methyl equilenin compounds in accordance with the following reaction:

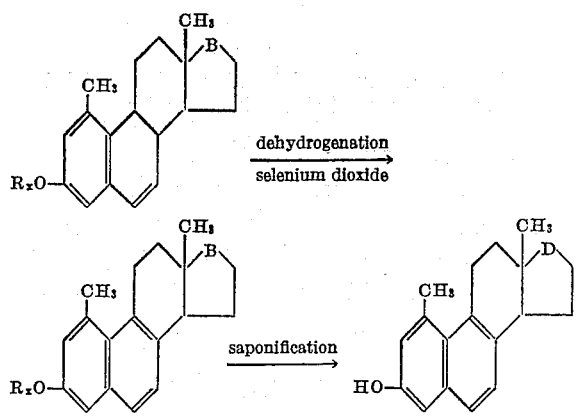

In the above reactions $R_X$, B and D represent the same groups as previously set forth.

In the above reaction the preferred dehydrogenating agent is selenium dioxide. However, other common dehydrogenating agents, such as palladized charcoal, other precious metal catalysts, chloranil and the like may be used. In general the 1-methy-Δ⁶-dehydroestrogen is dissolved in a suitable solvent such as acetic acid or dioxane and refluxed for a short period of time with the catalyst under an atmosphere of nitrogen. The reaction mixture is then filtered to remove the selenium and the filtrate diluted with water. The resultant product is then filtered and recrystallized from a suitable solvent, such as methanol. The esters produced may then be saponified as previously set forth.

The following specific examples serve to illustrate the present invention but are not intended to limit the same:

*Example I*

A mixture of 15.5 g. of Δ¹,⁴,⁶-androstatrien-3,17-dione, 3.90 g. of p-toluenesulfonic acid and 600 cc. of acetic anhydride was heated for five hours on a steambath. The cooled solution was hydrolyzed by swirling with water, the crystalline product was filtered, dried and recrystallized from methanol; yield, 12.85 g. (72%), melting point 147–149° C. Further recrystallization from the same solvent gave pure 1-methyl-Δ⁶-dehydroestrone acetate with a melting point of 152–153° C. $[\alpha]_D^{20}$—94° (dioxane); ultra-violet maxima at 222 mu (log E 4.444) and 264 mu (log E 3.93).

*Analysis.*—Calculated for $C_{21}H_{24}O_3$: C, 77.75; H, 7.46. Found: C, 78.09; H, 7.53.

*Example II*

Saponification of the acetate of Example I was accomplished in 97% yield by refluxing with 2% methanolic sodium hydroxide solution for one hour. Two recrystallizations from methanol gave 1-methyl-Δ⁶-dehydroestrone with a melting point of 250–252° C. $[\alpha]_D^{20}$—87.7° (chloroform) —76.8° (dioxane); ultra-violet maxima at 228 mu (log E 4.49), 268 mu (log E 3.90) and 306 mu (log E 3.28).

*Example III*

A mixture of 2.7 g. of Δ¹,⁴,⁶-androstatrien-17-ol-3-one 17-acetate, 100 cc. of acetic anhydride and 1 g. of p-toluene sulfonic acid was subjected to the same procedure as in Example I. 2.89 g. (95%) of 1-methyl-Δ⁶-dehydroestradiol-3,17-diacetate was produced with a melting point of 110–113° C. Recrystallization from hexane gave in 71% yield the purified compound with a melting point of 116–117° C. $[\alpha]_D^{20}$—149; ultra-violet maxima at 222 mu (log E 4.46) and 264 mu (log E 3.96).

*Analysis.*—Calculated for $C_{23}H_{28}O_4$: C, 74.97, H, 7.65. Found: C, 74.76, H, 7.38.

This same rearrangement was also effected utilizing the free 17 hydroxy compound which was acetylated under the conditions of the rearrangement to produce the same product. The same reaction was also carried out utilizing 10% by weight of sulfuric acid as the catalyst instead of the p-toluene sulfonic acid. When sulfuric acid was used as the catalyst, the reaction was preferably carried at room temperature.

*Example IV*

Saponification of the diacetate of Example III by refluxing with 2% methanolic sodium hydroxide solution similarly to Example II produced in substantially quantitative yield 1-methyl-Δ⁶-dehydroestradiol having a melting point of 130–132° C. This melting point was unchanged after several recrystallizations from either hexane acetone or dilute methanol $[\alpha]_D^{20}$—124° (chloroform), —134° dioxane; ultra-violet maxima at 226 mu (log E 4.57) and 266 mu (log E 3.95).

*Analysis.*—Calculated for $C_{19}H_{24}O_2$: C, 80.24, H, 8.50. Found: C, 80.48, H, 8.50.

The phenol produced was readily soluble in 2N aqueous sodium hydroxide and was benzoylated by the Schotten-Baumann method to produce 1-methyl-Δ⁶-dehydroestradiol-3-monobenzoate having a melting point of 146–147.5° C. after recrystallization from hexane-acetone, $[\alpha]_D^{20}$—123°.

*Analysis.*—Calculated for $C_{26}H_{28}O_3$: C, 80.42, H, 7.27. Found: C, 80.35, H, 7.19.

*Example V*

A solution of 2 g. of 1-methyl-Δ⁶-dehydroestrone acetate of Example I in 600 cc. of dry ether was refluxed with 1 g. of lithium aluminum hydride for thirty minutes. After the usual work-up, there was obtained 1.54 g. (88%) of 1-methyl-Δ⁶-dehydroestradiol having a melting point of 129–132° C., which gave no depression on admixture with the sample prepared according to Example IV and possessed the same rotation and spectrum.

Example VI

A solution of 4 g. of 1-methyl-Δ⁶-dehydroestrone acetate having a melting point of 147–149° C. of Example I in 60 cc. of ethyl acetate was shaken in the presence of hydrogen with 800 mg. of 10% palladium-on-charcoal catalyst for two hours, at which time the hydrogen uptake corresponded to one mol. After filtration, evaporation and recrystallization from methanol, 3.5 g. (87%) of 1-methylestrone acetate was obtained having a melting point of 157.5–158.5° C. $[\alpha]_D^{20}+224°$ (chloroform), +219° (dioxane); ultra-violet maximum at 268 mu (log E 2.52) and minimum at 252 mu (log E 2.31). It is to be noted that the so-called 1-methylestrone described in the literature did not form a crystaline acetate.

*Analysis.*—Calculated for $C_{21}H_{26}O_3$: C, 77.26; H, 8.02. Found: C, 77.14; H, 8.20.

Example VII

Alkaline saponification of the 1-methylestrone acetate of Example VI in accordance with procedure of Example II led in quantitative yield after recrystallization from methanol to 1-methylestrone, having a melting point of 250–252° C. $[\alpha]_D^{20}+257°$ (chloroform), +246° (dioxane); ultra-violet maximum at 282 mu (log E 3.26) and minimum at 250 mu (log E 2.51). The so-called 1-methylestrone, described in the literature, had a melting point of 249–251° $[\alpha]_D^{20}+271.6°$ and a mixture of the two specimens melted at 212–223° C. In contrast to the latter substance, 1-methylestrone of the present invention dissolved on warming in 5% aqueous alkali and exhibited approximately one-half the estrogenic potency of estrone in rats.

*Analysis.*—Calculated for $C_{19}H_{24}O_2$: C, 80.24; H, 8.50. Found: C, 80.05; H, 8.50.

Example VIII

Hydrogenation of the Δ⁶-dehydro diacetate of Example III in the manner described in Example VI, in ethyl acetate solution with 10% palladium-on-charcoal catalyst (barium sulfate supported catalyst was equally satisfactory) afforded 81% of shiny, prismatic blades (from methanol) of 1-methylestradiol-3,17-diacetate with a melting point of 178–180° C. $[\alpha]_D^{20}+111°$; ultra-violet maximum at 268 mu (log E 2.53) and minimum at 252 mu (log E 2.44). The so-called 1-methylestradiol 3,17-diacetate described in the literature had a melting point of 138.5–139°.

Example IX 1-methylestradiol, prepared either by saponification of its diacetate of Example VIII or by hydrogenation of 1-methyl-Δ⁶-dehydroestradiol of Example IV in accordance with the procedure of Example VI, was obtained from etherhexane as a microcrystalline powder, which shrank at 95° C. and melted at 110–116° C. $[\alpha]_D^{20}+146°$; ultra-violet maximum at 284 mu (log E 3.28) and minimum at 250 mu (log E 2.25). The physical constants of this alkali-soluble estrogenically potent phenol are in complete contrast to those reported for the so-called 1-methylestradiol: insoluble in alkali, crystallizes readily, melting point 235.5–236.5° $[\alpha]_D^{20}+185°$ (dioxane).

*Analysis.*—Calculated for $C_{19}H_{26}O_2$: C, 79.67; H 9.14. Found: C, 79.87; H, 9.36.

Example X

The 3,17-dipropionate of the 1-methylestradiol of Example IX was isolated in nearly quantitative yield on heating 1-methylestradiol for one hour with propionic anhydride and pyridine; colorless plates from methanol, having a melting point of 125.5–127° C. $[\alpha]_D^{20}+101.5°$; ultra-violet maximum at 268 mu (log E 2.58) and minimum at 254 mu (log E 2.45).

*Analysis.*—Calculated for $C_{25}H_{34}O_4$: C, 75.34; H, 8.59. Found: C, 75.16; H, 8.63.

Example XI

A solution of 1 g. of 1-methyl-Δ⁶-dehydroestrone acetate of Example I in 20 cc. of glacial acetic acid or dioxane was refluxed for ten minutes with 0.17 g. of freshly sublimed selenium dioxide under nitrogen. After filtration of selenium, the solution was diluted with water, the pink solid (0.90 g., melting point 160–165° C.) was filtered and recrystallized from methanol, yielding 0.62 g. of 1-methylequilenin acetate as colorless crystals with a melting point of 171–172.5° C. $[\alpha]_D^{20}+113°$.

*Analysis.*—Calculated for $C_{21}H_{22}O_3$: C, 78.23; H, 6.88. Found: C, 78.54; H, 6.98.

Example XII

Alkaline saponification of the acetate of Example XI afforded 1-methylequilenin, which after recrystallization from aqueous methanol had a melting point of 215–217° C. $[\alpha]_D^{20}+138.5°$ (dioxane). The ultraviolet spectrum closely resembled that of equilenin.

Example XIII

A mixture of 1 g. of 1-methyl-Δ⁶-dehydroestradiol 3,17-diacetate, 0.15 g. of selenium dioxide and 15 cc. of glacial acetic acid was refluxed for fifteen minutes. After filtering, pouring into water and recrystallizing from hexane-acetone, colorless plates of 1-methyl-17-dihydroequilenin 3,17-diacetate with a melting point of 136–137° C. $[\alpha]_D^{20}-16°$ (chloroform) was obtained. Saponification and recrystallization from aqueous methanol or hexane-acetone yielded 1-methyl-17-dihydroequilenin-17β, having a melting point of 225–227° C. $[\alpha]_D^{20}+33°$ (dioxane).

The last-mentioned compound could also be obtained by lithium aluminum hydride reduction of the 1-methyl equilenin acetate of Example XI.

This application is a division of U.S. application Serial No. 413,952, now Patent No. 2,791,592, which is in turn a division of U.S. application Serial No. 153,296, now Patent No. 2,671,092.

We claim:
1. A process for the production of compounds having the following formula:

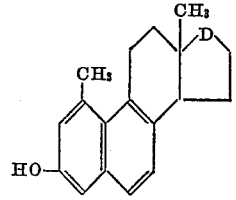

wherein D is selected from the group consisting of C=O and CH—OH which comprises dehydrogenating a compound of the following formula:

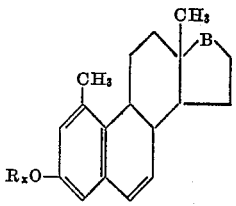

wherein B is selected from the group consisting of C=O and CH—OR_y and R_y is selected from the group consisting of a lower alkyl group, a benzyl group, the residue of a lower fatty acid and the residue of benzoic acid, and R_x is selected from the group consisting of the residue of acetic acid and the residue of propionic acid with selenium dioxide and thereafter saponifying the dehydrogenation product with an alkali metal hydroxide.

2. A process for the production of 1-methyl equilenin esters, which comprises dehydrogenating 1-ethyl-Δ⁶-dehydroestrone esters with selenium dioxide.

3. A process for the production of 1-methyl equilenin, which comprises dehydrogenation 1-methyl-Δ⁶-dehydroestrone esters with selenium dioxide and thereafter saponifying the 1-methyl equilenin ester thus formed with an alkali metal hydroxide.

4. A process for the production of 1-methyl-17-dihydro equilenin esters, which comprises dehydrogenating 1-methyl-Δ⁶-dehydroestradiol esters with selenium dioxide.

5. A process for the production of 1-methyl-17-dihydro equilenin, which comprises dehydrogenating with selenium dioxide 1-methyl-Δ⁶-dehydrostradiol esters to form an ester of 1-methyl-17-dihydro equilenin and thereafter saponifying said ester with an alkali metal hydroxide.

6. A new compound comprising 1-methyl equilenin acetate having a melting point of 171–172.5° C.

7. A new compound comprising 1-methyl equilenin having a melting point of 215–217° C.

8. A new compound, comprising 1-methyl-17-dihydro-equilenin-3,17-diacetate having a melting point of 136–137° C.

9. A new compound, comprising 1-methyl-17-dihydro-equilenin-17β having a melting point of 225–227° C.

10. 1-methyl equilenin compounds selected from the group consisting of 1-methyl equilenin, lower fatty acid esters of 1-methyl equilenin, the benzoate of 1-methyl equilenin, lower alkyl ethers of 1-methyl equilenin, 1-methyl-17-dihydro-equilenin, lower alkyl ethers of 1-methyl-17-dihydro-equilenin, 3,17-di lower fatty acid esters of 1-methyl-17-dihydro-equilenin, 3-mono lower fatty acid esters of 1-methyl-17-dihydro-equilenin, the 3,17-di benzoate of 1-methyl-17-dihydro-equilenin, and the 3-mono benzoate of 1-methyl-17-dihydro-equilenin.

References Cited in the file of this patent
UNITED STATES PATENTS

| | | |
|---|---|---|
| 2,267,258 | Ruzicka | Dec. 23, 1941 |
| 2,280,828 | Inhoffen | Apr. 28, 1942 |
| 2,844,513 | Wettstein et al. | July 22, 1958 |

OTHER REFERENCES

Bachmann et al.: J.A.C.S., vol. 62, pp. 824–39 (1940).
Inhoffen Angewandte Chem. 53 (1940), pp. 471—475.
Badger: J. Chem. Soc., vol. 1947, pp. 764–6 (1947).
Heer et al.: Helv. Chim. Acta., vol. 30, pp. 550–8 (1947).
Inhoffen Angewandte Chem. 59 (1947), pp. 207–212.
McKenzie et al.: J. Biol. Chem., vol. 173, pp. 271–81 (1947).
Fieser & Fieser: Natural Products Related to Phenanthrene, 1949, p. 329.
Djerassi et al.: J.A.C.S., vol. 72, pp. 4534–40 (1950).